United States Patent
Muller et al.

(10) Patent No.: US 10,341,535 B2
(45) Date of Patent: Jul. 2, 2019

(54) COLOR CALIBRATION (71) Applicant: HEWLETT-PACKARD DEVELOPMENT COMPANY, LP, Houston, TX (US)

(72) Inventors: Andreas Muller, Barcelona (ES); Peter Morovic, Sant Cugat del Valles (ES); Jordi Arnabat Benedicto, L'Arboc del Penedes (ES); Jan Morovic, Colchester (GB)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 15/542,719

(22) PCT Filed: Jan. 30, 2015

(86) PCT No.: PCT/EP2015/051941
§ 371 (c)(1),
(2) Date: Jul. 11, 2017

(87) PCT Pub. No.: WO2016/119880
PCT Pub. Date: Aug. 4, 2016

(65) Prior Publication Data
US 2017/0374237 A1     Dec. 28, 2017

(51) Int. Cl.
*H04N 1/60* (2006.01)
*G01J 3/52* (2006.01)
(Continued)

(52) U.S. Cl.
CPC .......... *H04N 1/6033* (2013.01); *B41J 29/393* (2013.01); *G01J 3/52* (2013.01);
(Continued)

(58) Field of Classification Search
CPC ............ H04N 1/6033; H04N 1/00023; H04N 1/00087; G01J 3/52; G01J 2003/466
(Continued)

(56) References Cited

U.S. PATENT DOCUMENTS 7,239,402 B2   7/2007   Soler et al.
8,456,700 B2   6/2013   Mestha et al.
(Continued)

FOREIGN PATENT DOCUMENTS

CN   101662571   3/2010
CN   102572166   7/2012
(Continued)

OTHER PUBLICATIONS

Chen, et al. RIT Scholar Works. Exploring the color inconstancy of prints, Publication Date May 8, 2005.

*Primary Examiner* — Quang N Vo
(74) *Attorney, Agent, or Firm* — HP Inc. Ptent Department (57) ABSTRACT

A color calibration chart may be created including a plurality of colors that are variations of a print color established for printing a reference color by a printing system using multiple colors. The colors in the calibration chart may be measured. A color from the calibration chart may be selected for printing the reference color which has a measurement value indicative of a color consistency within a predefined distance from a reference value for the print color.

15 Claims, 10 Drawing Sheets (51) Int. Cl.
*H04N 1/00* (2006.01)
*G01J 3/46* (2006.01)
*B41J 29/393* (2006.01)
*H04N 1/62* (2006.01)

(52) U.S. Cl.
CPC .......... *G01J 3/524* (2013.01); *H04N 1/00023* (2013.01); *H04N 1/00087* (2013.01); *H04N 1/6044* (2013.01); *H04N 1/622* (2013.01); *G01J 2003/466* (2013.01)

(58) Field of Classification Search
USPC .................................. 358/1.9, 1.15, 518, 448
See application file for complete search history.

(56) References Cited

U.S. PATENT DOCUMENTS

| | | | |
|---|---|---|---|
| 8,743,421 | B1 | 6/2014 | Ross et al. |
| 8,763,528 | B2 | 7/2014 | Elkinson et al. |
| 2010/0085587 | A1 | 4/2010 | Hayward et al. |
| 2011/0069332 | A1* | 3/2011 | Katayama ............ H04N 1/6058 358/1.9 |
| 2011/0149313 | A1 | 6/2011 | Mestha et al. |
| 2011/0235141 | A1 | 9/2011 | Shestak et al. |
| 2013/0107291 | A1 | 5/2013 | Kuehn |
| 2014/0253931 | A1* | 9/2014 | Hashizume .............. H04N 1/50 358/1.9 |
| 2014/0313528 | A1* | 10/2014 | Suzuki ................. G06K 15/027 358/1.9 |

FOREIGN PATENT DOCUMENTS

| | | |
|---|---|---|
| CN | 103129184 | 6/2013 |
| CN | 104038665 | 9/2014 |
| CN | 104040520 | 9/2014 |
| JP | H10-210312 | 8/1998 |
| JP | 2011-166731 | 8/2011 |
| JP | 2012-070298 | 4/2012 |
| JP | 2013-001049 | 1/2013 |

* cited by examiner

COLOR CALIBRATION

BACKGROUND

Printing systems using multiple colors generate an image on a medium. The printing system may use printing fluids, such as inks, of different colors which may be jetted onto the medium. The printing system may also be an electrostatic printing system using printing fluids, such as toners, of different colors which generates a latent electrostatic image on a photoconductor member which is then transferred, either directly or indirectly, to the medium. Some electrostatic printing systems may use a dry toner powder whereas other printing systems, such as liquid electro-photographic (LEP) printing systems, may use a liquid toner.

DETAILED DESCRIPTION

A spot color, which may also be referred to as a reference color, is a premixed color and may be printed using a premixed printing fluid, like a premixed ink or a premixed toner. A spot color may be used for printing a logo of a company or for printing a trademark which may include specific colors which need to be reproduced correctly every time the logo or trademark is printed. Premixed colors may also be used in other fields of printing, e.g., the production of wall paper which is demanding in terms of color consistency and repeatability.

One example which may achieve the correct reproduction of the image with the spot color is to print the image on an analog press, like an offset printer, using a variety of premixed colors. Such analog presses may allow for effectively dealing, for example, with an N-channel spot color system that may use a spot color premixed from up to N different colors. Another example for printing a spot color is to provide in an ink jet printing system an ink container holding a premixed ink produced by mixing inks of different color in accordance with the spot color. When printing the spot color using an electrostatic printing system a toner cartridge holding a premixed toner may be used. When printing the spot color in the above described way, a spot color may be used in isolation with no ink combinations/overprints and at full concentrations with no transitions.

Printing systems generating a color image on a medium using inks or toners of different colors may produce a spot color without providing the premixed print material. In this case the spot color is produced using a process color which is printed using a combination of the inks or toners of different color that are available in the printing system. The process color may also be referred to as a print color. For printing the spot color a specific combination of the colors available in the color printing system may be selected. The combination may specify the amounts of colors to be used to produce the spot color. The specific combination of colors to be used by the printing system for producing the spot color may be stored in the printing system, for example in a look-up table associating the spot color name with the color combination.

The process or print color associated with the spot color may be determined, e.g., on the basis of a color sample printed on a selected print medium using a printing system. The print color may be used at later times when an image including the spot color is to be printed. The printing may be performed by the printing system which was initially used for determining the print color or a different printing system may be used. At the time of printing the spot color, the printing environment may have changed which may result in the printed spot color to perceptibly differ from the initial spot color on the basis of which the print color was established. For example, as mentioned above, a different printer may be used for printing or, when producing a batch of print outs, a plurality of printers may be used in parallel. Also, over the time, the properties of a printer may change, for example, the properties of the inks or toners may change. Some parts of the printer may be replaced, for example the print head. Further, environmental parameters, like humidity and temperature, may change when compared to the environmental parameters at the time initially setting the print color for printing the spot color. Also the properties of the print medium may change over time or different print media may be used so that the printouts of the spot color may perceptibly differ.

The techniques described herein allow, in some examples, to maintain a color consistency for a spot color when printing the spot color after establishing the print color for printing the spot color.

Figure 1:
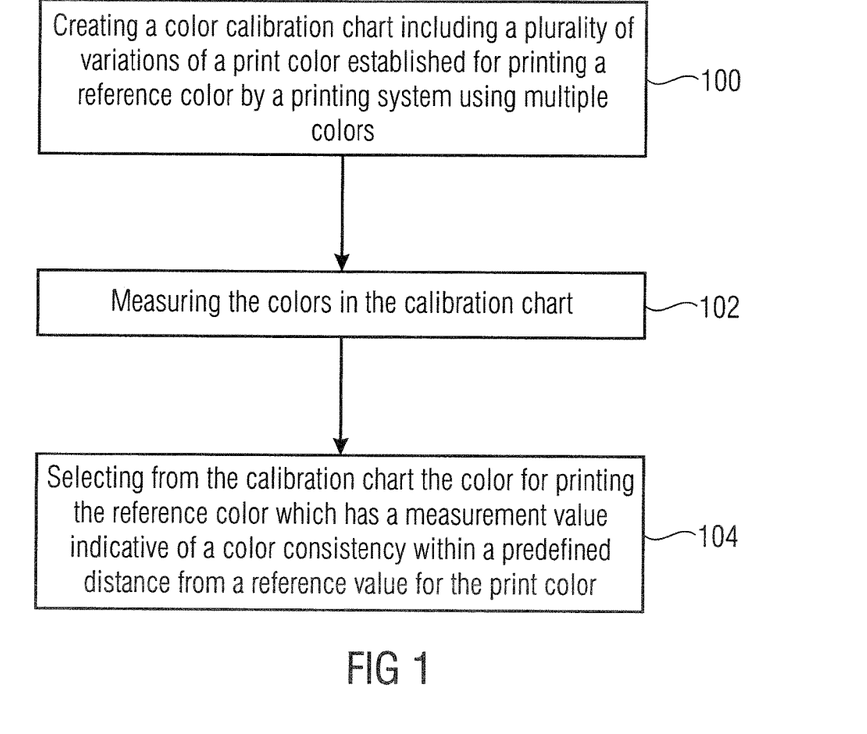
FIG. 1 is a flow diagram outlining an example of a method for calibrating.

FIG. 1 is a flow diagram outlining an example of a calibration method. As is shown at 100 the method includes creating a color calibration chart having a plurality of colors. The plurality of colors includes a plurality of variations of a print color established for printing a reference color by a printing system using multiple colors. At 102 the colors in the calibration chart are measured, and at 104, from the calibration chart, the color for printing the reference color is selected which has a measurement value indicative of a color consistency within a predetermined distance from a reference value for the established print color.

The calibration allows, for example, compensating for changes in the printing environment after setting up or establishing the print color for printing the reference color. Thereby, undesired differences, like perceptible differences, between the reference color printed using the established print color and the reference color printed later may be avoided or reduced. This allows, for example, for reliably reproducing a reference color, for example when repeatedly printing a logo or a trademark, without the need of providing a premixed color for printing the spot color. In applications where large areas are to be provided with a reference color, e.g., on panels to be placed side by side, the calibration ensures that the reference colors are printed without or substantially without perceptible differences. An example for such a technique is the wallpaper production which is dominated by analog printing processes using premixed colors due to the demands in terms of color consistency and repeatability, which are due to installing the wallpapers in a paneling mode where side-to-side color differences in a regular colored pattern may be easily visible. The calibration technique described herein allows using multicolor printing systems using a process color for printing the reference color without the need for creating, e.g., specific premixed inks.

The calibration may create the color calibration chart which, in accordance with examples, may be measured automatically. On the basis of the measurement value an appropriate color from the calibration chart may be selected which is considered the best match for the reference color so that perceptible differences when printing the reference color are avoided or reduced. In accordance with an example, the variations of the print color in the color calibration chart are generated independent of the ICC (international color consortium) profile of the printing system, which may allow for increasing the calibration resolution in the close vicinity of the print color. The techniques described herein may achieve a high color consistency over long time frames, from printer to printer using the same media, and from paper to paper in the same batch.

The following description makes reference to ink jet printing systems and to spot colors, however, the techniques described herein may also apply to other color printing systems using any type of printing fluid, for example electrostatic color printing systems using dry toner or liquid toner of different colors. Also, the techniques described herein may apply to any reference color defined by a specific premix of colors that is to be reproduced by a process color provided by a multiple color printing system.

Figure 2:
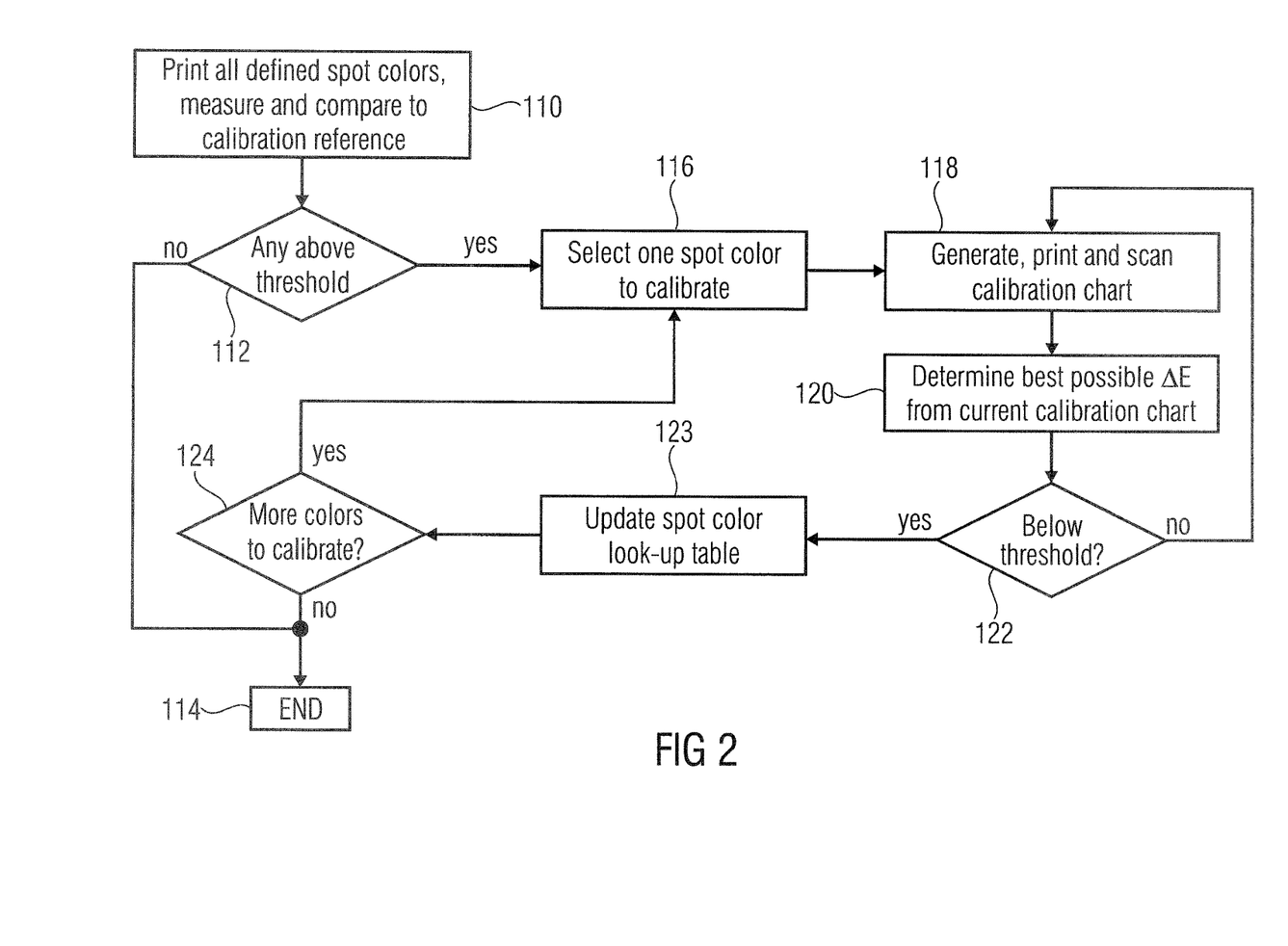
FIG. 2 is a flow diagram outlining another example of a method for calibrating.

FIG. 2 is a flow diagram outlining another example of a method for calibrating. At 110 all defined spot colors are printed, measured and compared to respective calibration references, which are also referred to as reference values. A current color sample is printed using the established print color of the printing system. The current color sample is printed on a substrate and measured, for example by a spectrophotometer which may be an internal spectrophotometer of the printing system. In accordance with examples, the measurement result reflects the coordinates for the color of the current color sample in a color space, which may be a device independent color space, like the Lab color space. The measurement is compared to the calibration reference, which may reflect the coordinates for the color of the calibration color sample in the color space printed earlier.

At 112 it is determined whether any of the measurement values obtained is above a threshold. A measurement value above the threshold indicates that the current color sample of the spot color differs from the earlier color sample and that the difference may be perceptible or visible. In other words, a current color sample for the spot color having a measurement value above the threshold indicates that the color consistency between the current sample and the earlier color sample is not within a predefined range. When it is determined at 112 that none of the measurement values for the spot colors is above the threshold, the method ends at 114. In accordance with examples, the printing system may proceed with printing the spot color using the print color as currently established and saved, e.g., in a look-up table.

When it is determined at 112 that any of the measurement values for the spot colors obtained at 110 are above the threshold, one spot color having a measurement value above the threshold is selected at 116 for calibration. At 118 a calibration chart is generated, printed and scanned, and at 120 the best possible color consistency ΔE is determined which indicates the difference between the current color sample and the earlier color sample in the color space. At 122 it is determined whether the measurement value for a color selected from the calibration chart, when compared to the calibration reference is below the threshold. In case it is not below the threshold, a new calibration chart having, for example, a finer resolution or systematically modified process color compositions (contone values) is generated, printed and scanned, and the best possible ΔE value obtained from the new calibration chart is selected. Once a color has been selected with a measurement value below the threshold, the new process color combination for this particular spot color will be updated in the spot color look-up table as is shown at 123. At 124 it is determined whether there are further spot colors which need to be calibrated. In case there are further spot colors, the process returns to 116 where the next spot color for calibration is selected, and the calibration as discussed above is repeated. Once all spot colors have been calibrated, the method the calibration ends at 114, and the calibrated spot colors may be used for printing.

In accordance with examples, the calibration reference may be determined by printing a color sample of the spot color using the established print color, which may be described by respective contone values. The color sample is measured, for example by a spectrophotometer, which may be an internal spectrophotometer of the printing system. The color sample may be generated and measured for obtaining the calibration reference when populating a look-up table of the printing system with the spot color and the associated print color for the first time. In accordance with another example, the color sample may be generated and measured using a printing system different from the printing system currently used for printing. The currently used printing system may be provided with the spot color name and the established print color established which may be stored in a spot color look-up table. The calibration value may also be supplied to the currently used printing system and stored. In accordance with examples, the calibration reference may form the basis for future calibrations.

In accordance with other examples, the calibration reference may be used during a first calibration procedure following the setup of the system, and the process described with regard to FIG. 2 includes the manipulation of the look-up table of the printing system for updating the print color or contone values used for creating the spot color. The calibration reference may be generated once, e.g., right after a visual set-up process, and may remain fixed so as not to be changed again. The calibration history may be stored, e.g., the best match for each calibration cycle, both in contone and ΔE terms. Any further calibration of the system may then start from the updated print color. For example, when performing a calibration shortly after the last calibration and when the properties of the printing system did not substantially change, it is likely that the calibration process yields spot colors all below the threshold at 110 in FIG. 2. In other words, in accordance with examples, after a calibration cycle there may be slightly different contone values assigned to the spot color, e.g., the contone values newly assigned may be the one with the least possible ΔE to the earlier calibration reference.

In accordance with an example, at 110 in FIG. 2, all defined spot colors are included into the CLC (Close Loop Color Calibration) chart for a measurement. The measurement yields the coordinates for a current color sample of the spot color in the color space, for example the device independent Lab color space, and on the basis of these coordinates ΔE is obtained. In accordance with examples, when it is determined that ΔE is larger than the threshold, a user may be prompted to initiate the spot color calibration. The printing system may have a display outputting to a user the suggestion to perform the spot color calibration, and in response the user may select the spot colors to be calibrated. In other examples, the calibration may be initiated automatically by the printing system in case ΔE is larger than the threshold, and the calibration process may be performed without user interaction.

Creating the spot color calibration chart at 118, in accordance with examples, includes analyzing the vector contribution of the color difference between the calibration reference and the measurement value. The vector contribution influences the construction of the calibration chart in the first place and indirectly the selection of a specific color patch. The color calibration chart may be created sequentially from close vicinity to larger color differences. In accordance with an example, creating the color calibration chart includes looking for all colors with x+ΔE to x−ΔE. The range determined is filtered using the actual ΔL, Δa and Δb values representing the vector contribution of the color difference. Any linear combinations may be removed, and the results may be interpolated. The calibration chart size may be limited to a predefined number of patches, like 40 patches, per spot color to maintain the processing time within acceptable ranges.

Figure 3:
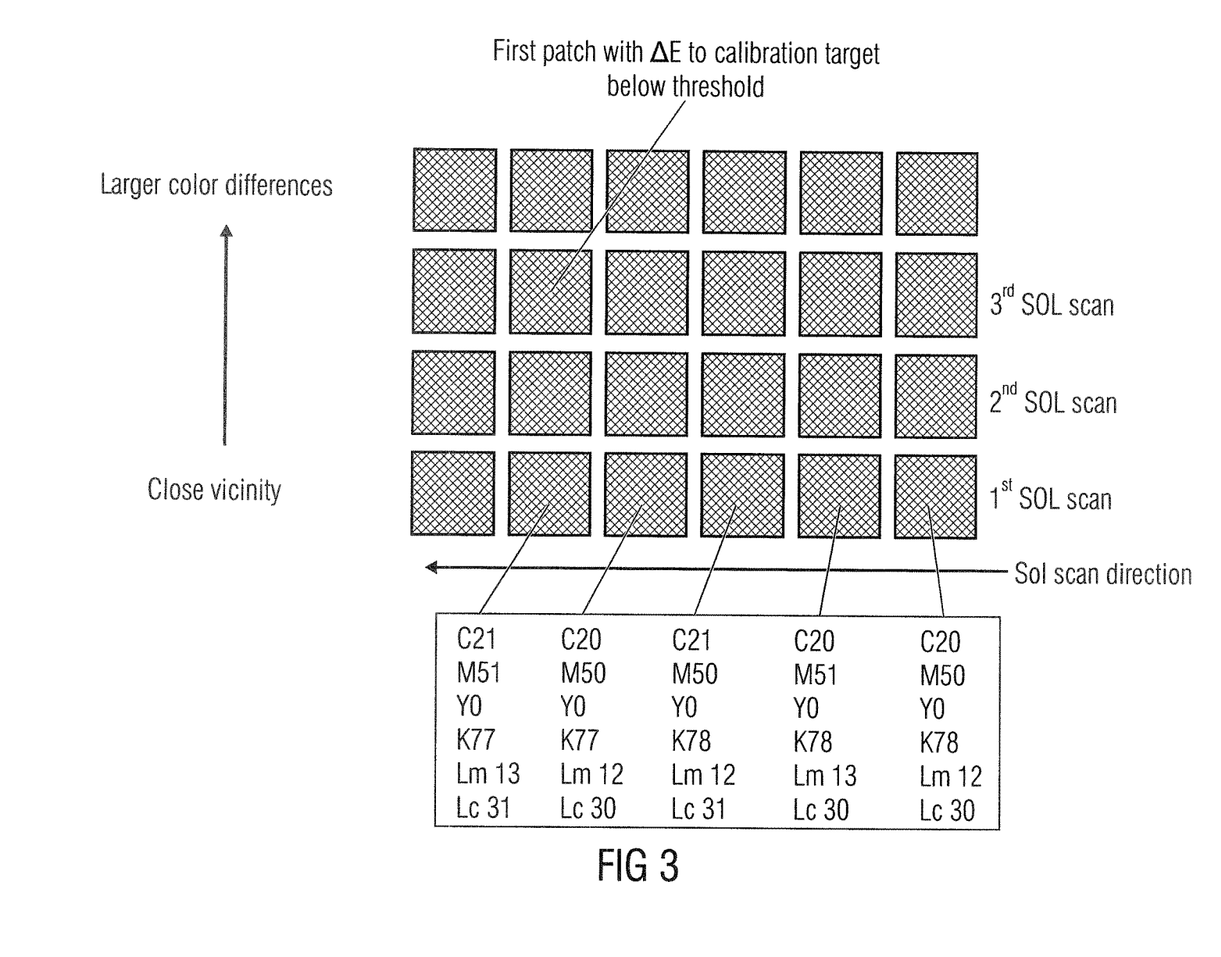
FIG. 3 shows an example of a color calibration chart.

FIG. 3 shows an example of the color calibration chart which has four SOL scan rows. As is indicated at the left of the chart, the variations of the current or established print color are generated starting with a close vicinity or small color difference to the print color in the first SOL scan row. The color difference increases for the further rows. The patches shown in FIG. 3 may be sequentially scanned per level/column by the SOL. For each of the color patches printed, the difference in color consistency ΔE when compared to the calibration reference is calculated. The scan may be terminated once the threshold is reached, as is for example indicated in FIG. 3 for the third patch in the third row. In accordance with examples, if the threshold is not reached, the minimum value for the color consistency ΔE may be used or the process may be iterated as is shown in FIG. 2 using a color calibration chart with a finer resolution. Below the chart examples of contone variations from patch to patch in the first row on the calibration chart are indicated for a CMYKmc ink printer. The first row has the smallest changes or changes designed to cover a certain ΔE which needs to be bridged to the calibration target. The following rows may introduce larger variations for each contone layer. In accordance with examples, the measurements may be performed using an internal spectrophotometer of the printer.

The internal spectrophotometer may be mounted on the printing carriage of the printer, and the movement of the spectrophotometer is bound along the scan axis similar to the movement while printing. The measurement takes place after printing in a separate process. The scan, like the $1^{st}$, $2^{nd}$ and $3^{rd}$ SOL scans depicted in FIG. 3, refers to one row of patches measured in one movement of the measurement device. ΔE is calculated while the media advances towards the next row. If a ΔE below threshold is found in the currently measured row the next doesn't need to be scanned anymore and the scanning process (spectrophotometry) can be aborted. The contone value of the patch with the below threshold ΔE may be used to update the calibrated color in the spot color look-up table.

In accordance with examples different priorities may be applied upon generating the color calibration chart depending on what region of the gamut the spot color is located. For example, areas showing a high chroma component may have different calibration chart priorities than areas with high neutrality. In other examples, light tones, mid-tones and dark tones may use different calibration charts.

In the examples described above, the method started with the printing of all defined spot colors which may include more than one spot color. The calibration process may also be applied to a single spot color that needs to be calibrated. In accordance with other examples printing an image may use a number of spot colors less than all defined spot colors for the printing system. The calibration process may be applied to selected ones of the defined spot colors.

In the examples described above, the calibration process is based on the printing of the spot color using the established print color, the measurement thereof and the comparison to the calibration reference obtained from printing the spot color. The calibration reference may be determined by the printing system that is also to be used for printing the spot color. The print color for printing the spot color may be determined by the currently used printing system or by a different printing system. Once the print color has been established, a color sample of the spot color is printed using the established print color. The color sample may be photospectrometrically measured for determining the calibration reference, e.g. the color values or the coordinates of the color of the color sample in a color space, like the Lab space. The print color, e.g., the respective contone values, the spot color name and the calibration reference may be provided and stored in the currently used printing system. In other examples, the currently used printing system may determine the calibration value, e.g., at a time when the print color information is received or at a time when printing the spot color for the first time. In accordance with other examples, the print color may be established by the currently used printing system.

In accordance with examples, the calibration is performed in response to a predefined event, e.g., the lapse of a predetermined time interval after obtaining the calibration reference or after the last printout of the spot color, or when the printing system was modified, or in response to a change of environmental parameters which are different from those environmental parameters at the time of obtaining the calibration reference, like a change of temperature or humidity in the environment of the printing system which is beyond a preset threshold. The calibration may also be triggered in response to a change of the print medium when compared to the print medium on the basis of which the calibration reference for the print color was determined.

Figure 4:
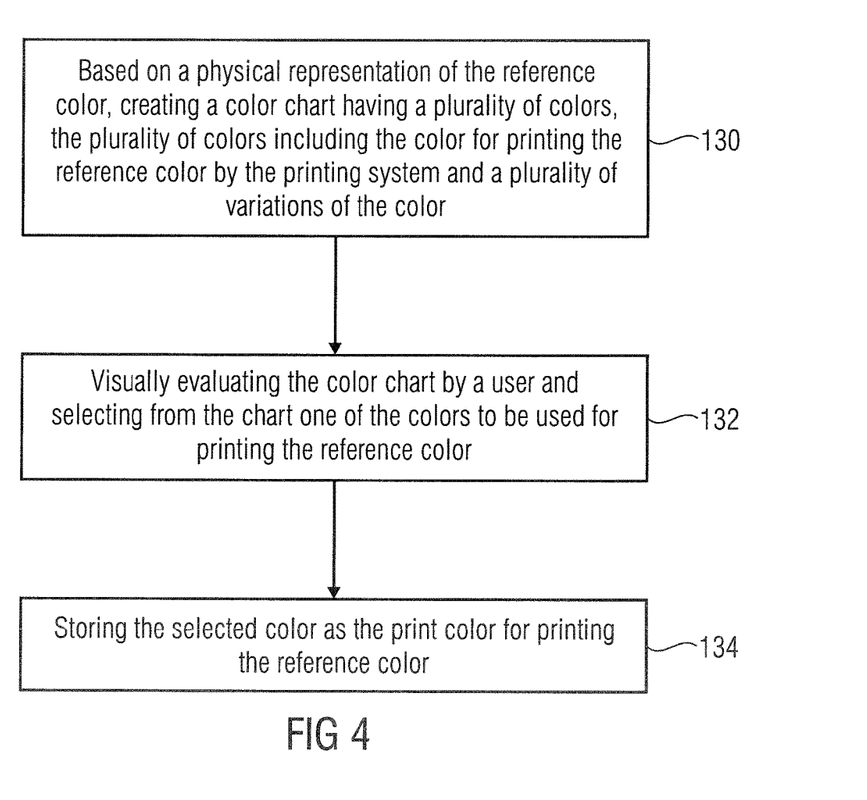
FIG. 4 is a flow diagram outlining an example of a spot color setup process.

In the following an example for establishing the print color for the spot color is described, which may be referred to as a spot color setup process. FIG. 4 is a flow diagram outlining an example of the spot color setup process. On the basis of a physical representation of the spot color the print color, e.g. the contone values, is established for printing the spot color using the colors of the printing system. At 130 a color chart is created which includes the established print color and a plurality of variations of the print color. At 132 the color chart is evaluated by the user, and the color to be used for printing the spot color is selected. At 134 the selected color is stored as the print color for printing the spot color.

Figure 5:
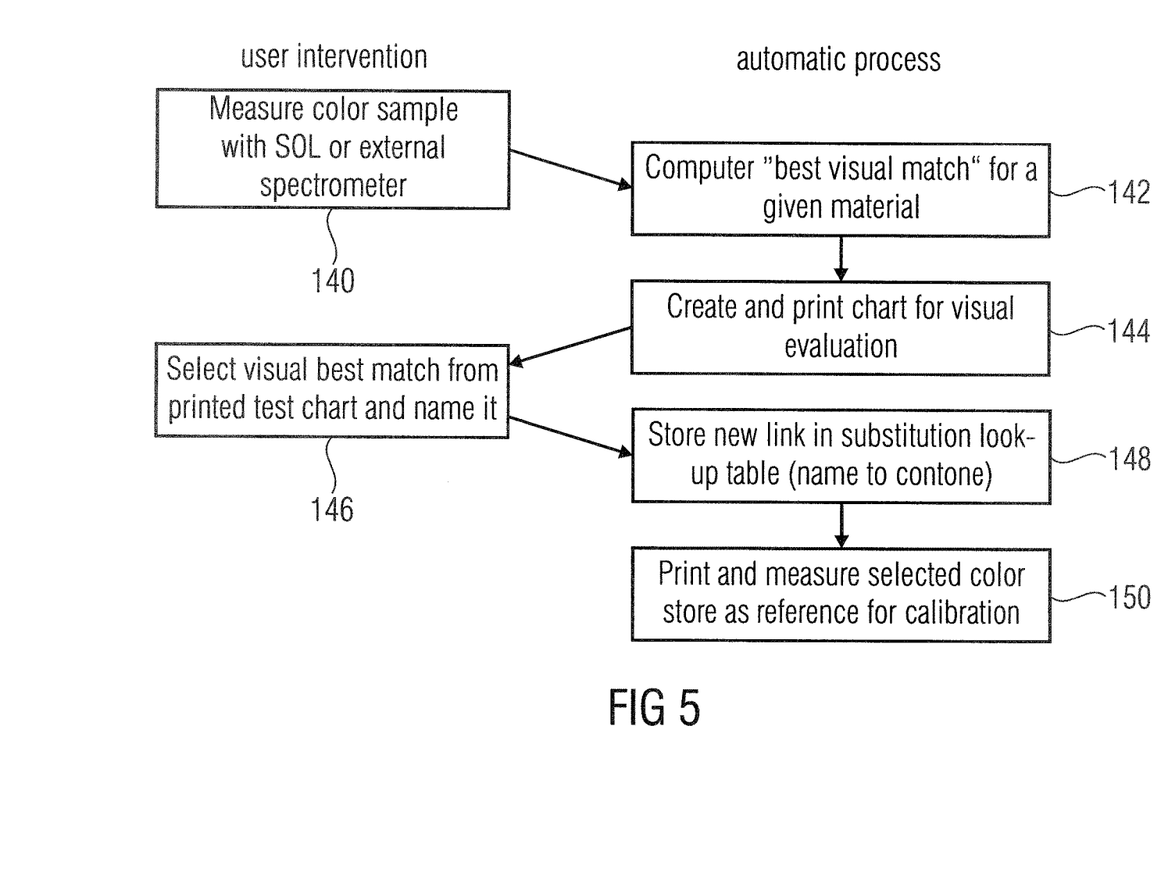
FIG. 5 is a flow diagram outlining another example of a spot color setup process.

FIG. 5 shows a flow diagram outlining another example of the spot color setup process. At 140 a color sample representing the spot color is measured using a SOL or an external spectrometer. At 142, on the basis of the measurement, a best visual match of the color is calculated which may be achieved by the printing system using the colors for printing the spot color. A controller of the printing system may include additional circuitry or may be programmed to receive the measurement results from the color sample and to determine, on the basis of the measurement results, the best visual match. At 144 the color chart for the visual evaluation is created and printed. For example, the controller may create the color chart on the basis of the match determined at 142 and control the printing system to print out the color chart. At 146 a user selects the best visual match from the printed color or test chart and, in accordance with examples, associates a name to the visual best match. At 148 a new link is stored in a substitution look-up table of the printing system including an association of the name selected at 146 with the print color of the selected color, e.g. the contone values. In accordance with examples, the above mentioned printing and measuring of the print color for obtaining the calibration reference may be carried out immediately following the establishing of the print color, as is indicated at 150.

In accordance with examples the spot color setup process, as described with regard to FIG. 4 or 5, may be based on a well calibrated and profiled printing substrate which is used to predict the best match (see 142 in FIG. 5) for a given Lab reference value. The input for the spot color setup process may be a physical representation of the reference color which, as indicated at 140 of FIG. 5, is either measured by an internal spectrometer (SOL) of the printing system or by an external device. In accordance with examples, the Lab reference value obtained from the measurement at 140 may be used to determine the corresponding contone values from the ICC profile of the printing system. The ICC profile may be used for Lab reference values within the gamut of the substrate on which the color sample was printed, and out of gamut samples may be processed by a visual best match procedure. Once the in gamut contone values has been established (see 142 in FIG. 5) the chart is created and printed which allows for the visual assessment of the output. The chart contains a number of variations for the mapped Lab reference value which are in the vicinity of the default mapping, and allow the user a fine-tuning with respect to their specific preference as well as to compensate for inevitable shortcomings of the default mapping carried out at 142. This allows to cater a wide range of printing surfaces, light sources and visual preferences of different populations. The outcome of the visual evaluation may populates a spot color look-up table in the printer or in an external device.

Figure 6:
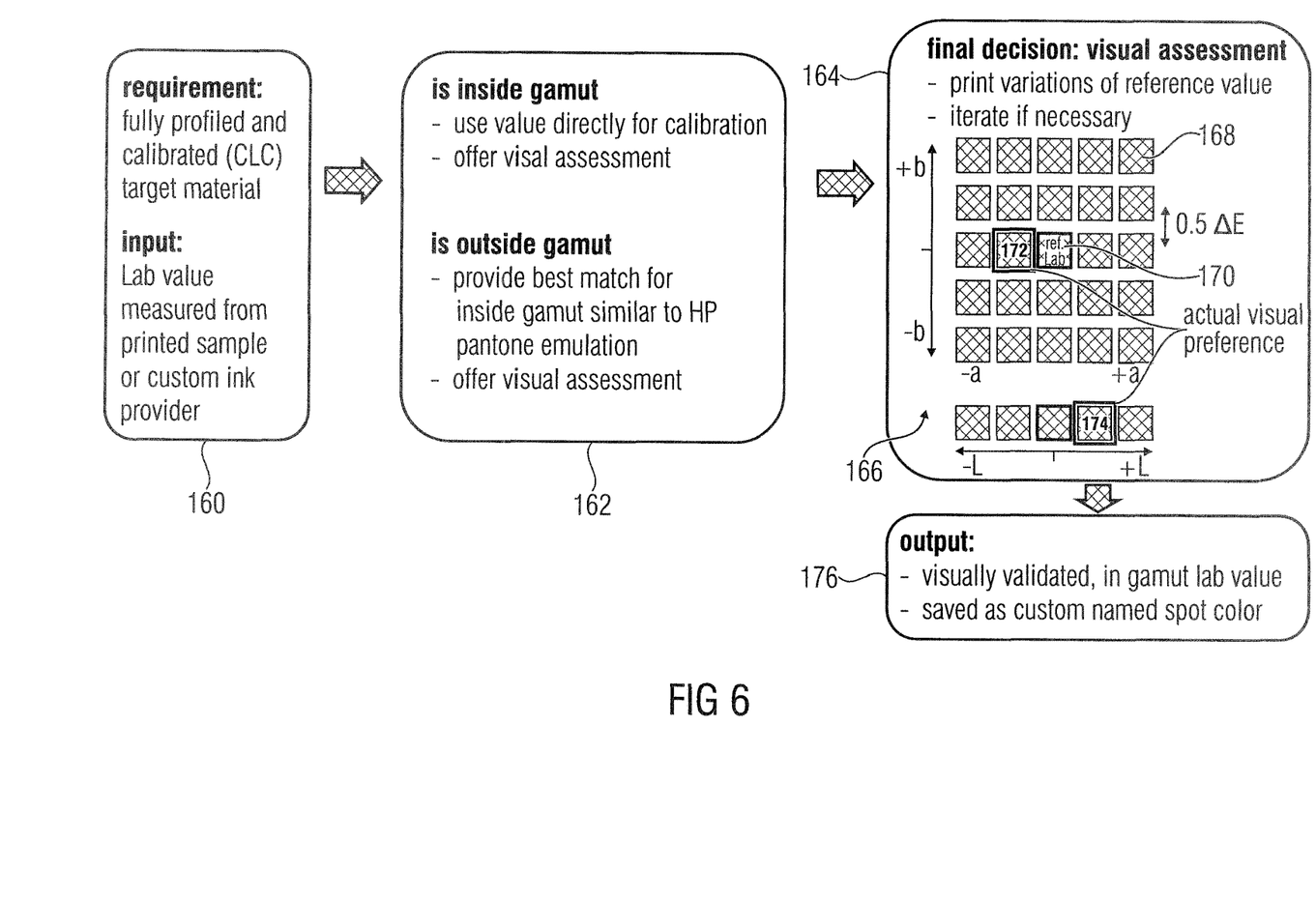
FIG. 6 is a block diagram of a spot color setup process in accordance with an example.

FIG. 6 is a block diagram of an example of a spot color setup process. Block 160 indicates the input for the spot color customization and setup process in accordance with an example. A fully profiled (ICC) and calibrated (CLC) target material or substrate is provided on which the spot color is printed, e.g., using a customized or premixed ink, and the Lab value for the spot color is measured from the printed sample. In other examples, the Lab value may be provided by the custom ink supplier or provider. At block 162, on the basis of the input from block 160, initial contone values representing the spot color using the colors available by the printing system are determined. When the Lab values indicate the color to be inside the gamut of the target material, the Lab value is directly used for the setup and, in accordance with examples, a visual assessment may be offered. When the Lab value is outside the gamut a best match approach is applied to obtain a value inside the gamut and a visual assessment may be offered. The visual assessment is indicated in block 164 and may comprise generating the color or test chart 166. The color chart includes a plurality of color patches 168 including the reference patch 170 which is printed on the basis of the value indicated by block 162. The remaining patches are variations of the reference patch 170 along the respective axis of the Lab color space. More specifically, in the upper part of the chart 166 the a-b plane of the color space is depicted and the respective patches are, in accordance with examples, printed with a predefined distance along the two axis from the reference patch 170, for example with a distance such that the neighboring color patches have a color difference of 0.5 ΔE. In the lower part of the chart 166 the reference patch is printed with different intensities L.

In accordance with examples, the color chart 166 is presented to a user for visual evaluation and selection of the color patch matching their desires the best. In the example in FIG. 6, the patches 172 and 174 may be selected by the user and, on the basis of this selection, the visually validated in gamut Lab value is determined at block 176 and saved for the custom named spot color. In block 164, in case the chart 166 does not include satisfactory patches, an iteration may be applied in which the distance between the patches is changed so as to provide for a higher resolution of the differences in the color patches which, in accordance with examples, may be independent from the ICC profile of the printing system allowing for an improvement in the final Lab value selected for printing the spot color.

Figure 7:
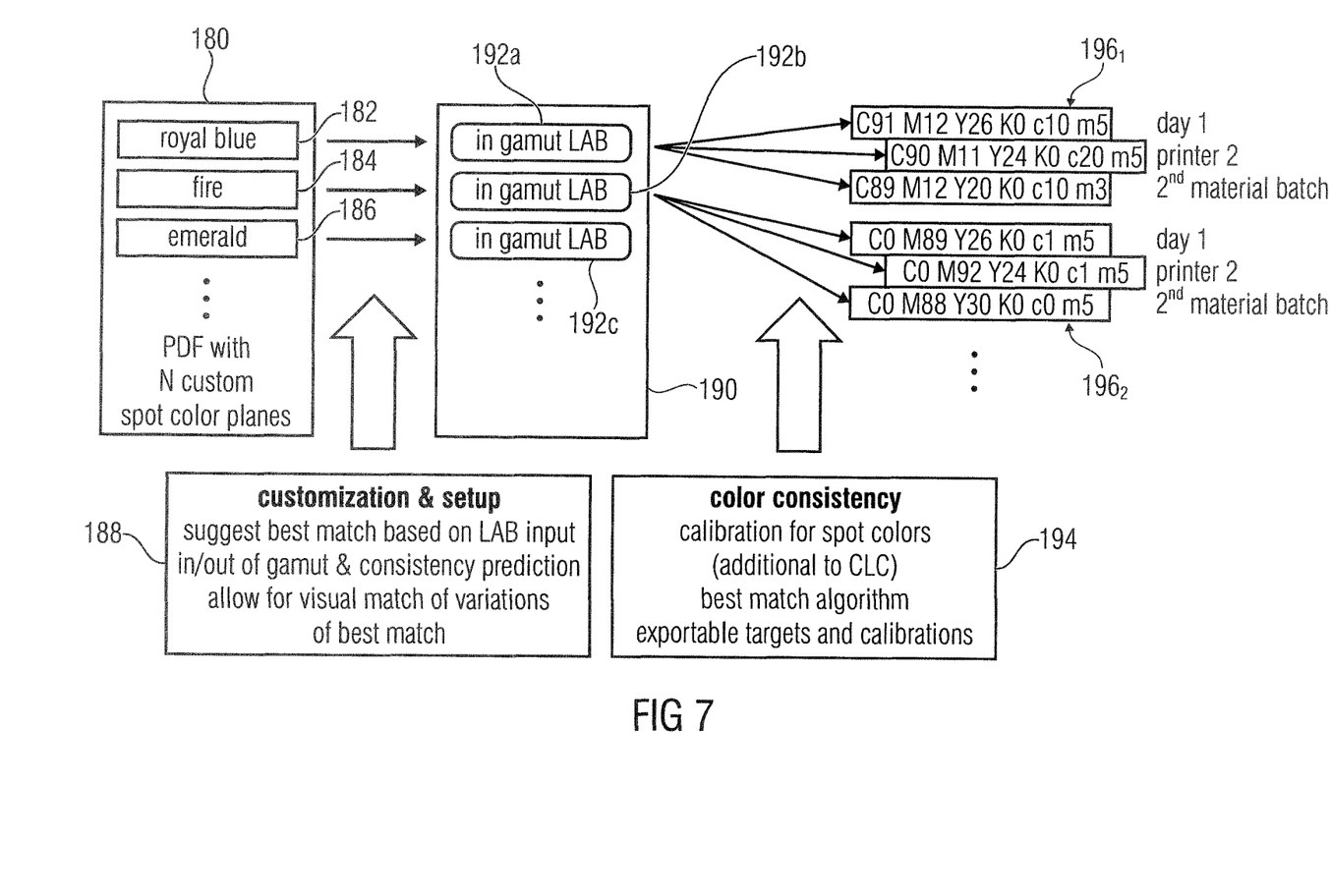
FIG. 7 is a schematic representation of an example of a combined spot color setup and calibration process in accordance with an example.

FIG. 7 is a schematic representation of an example of a combined spot color setup and calibration process in accordance with an example. In this example, a PDF document is assumed to have N custom spot color planes of which, at block 180, three color planes are indicated, namely the spot color plane royal blue 182, the spot color plane fire 184 and the spot color plane emerald 186. The spot color setup process described above with regard to FIGS. 5 and 6 may be applied to the PDF to be printed, as is schematically represented by block 188, which yields for each of the spot color planes at block 190 an associated in gamut Lab value 192a to 192c describing the print color selected in accordance with the process 188 for printing the respective spot color plane using the process color provided by the printing system. The calibration process, which has been described above with regard to different examples, is indicated in FIG. 7 at block 194. The calibration process is applied for ensuring color consistency of the spot colors to be printed using the print colors of the printing systems in situations where the properties for the printing of the reference color or spot color may have changed, for example in situations where different printers are used, long time frames apply or different papers are used. This is indicated in FIG. 7 at 196$_1$ and 196$_2$ indicating two examples for an output of the calibration process. More than these outputs of the calibration process may be possible. At 196$_1$ and 196$_2$ the different calibration results for the print colors 192a and 192b are indicated for a six-ink printing system using CMYKcm inks. At 196$_1$ and 196$_2$ the different contone values of the print colors are indicated dependent on the time, the kind of printer and the material.

The example described with regard to FIG. 7 includes two different modules, the spot color setup module and the spot color calibration module which both create and maintain a spot-color-to-contone look-up table. This look-up table contains the information needed to substitute a spot color with respective N-ink channel contone values, depending on the actual inks the printing system uses for printing. The setup is prior to processing and printing an input file, such as a multicolor plane PDF file. The look-up table is a direct link to the ink space, exposing the virtual ink to the operator/user while expressing actual ink contone values that the printer may handle. The example of FIG. 7 includes a six-ink system with CMYKcm inks which may be exposed as an eight-spot-color system, thereby internally mapping the eight-channel inputs (see block 180), the tagged spot colors, to the appropriate six-ink channel, printer-native outputs (see $196_1$ and $196_2$) while appearing to be an eight-virtual-ink printer. The substituted color values are not color managed by the ICC during the calibration, which allows to disconnect the calibration or the entire gamut from the ICC profile, thereby providing for additional freedom to assign a greater calibration resolution in the vicinity of the defined spot colors.

Figure 8:
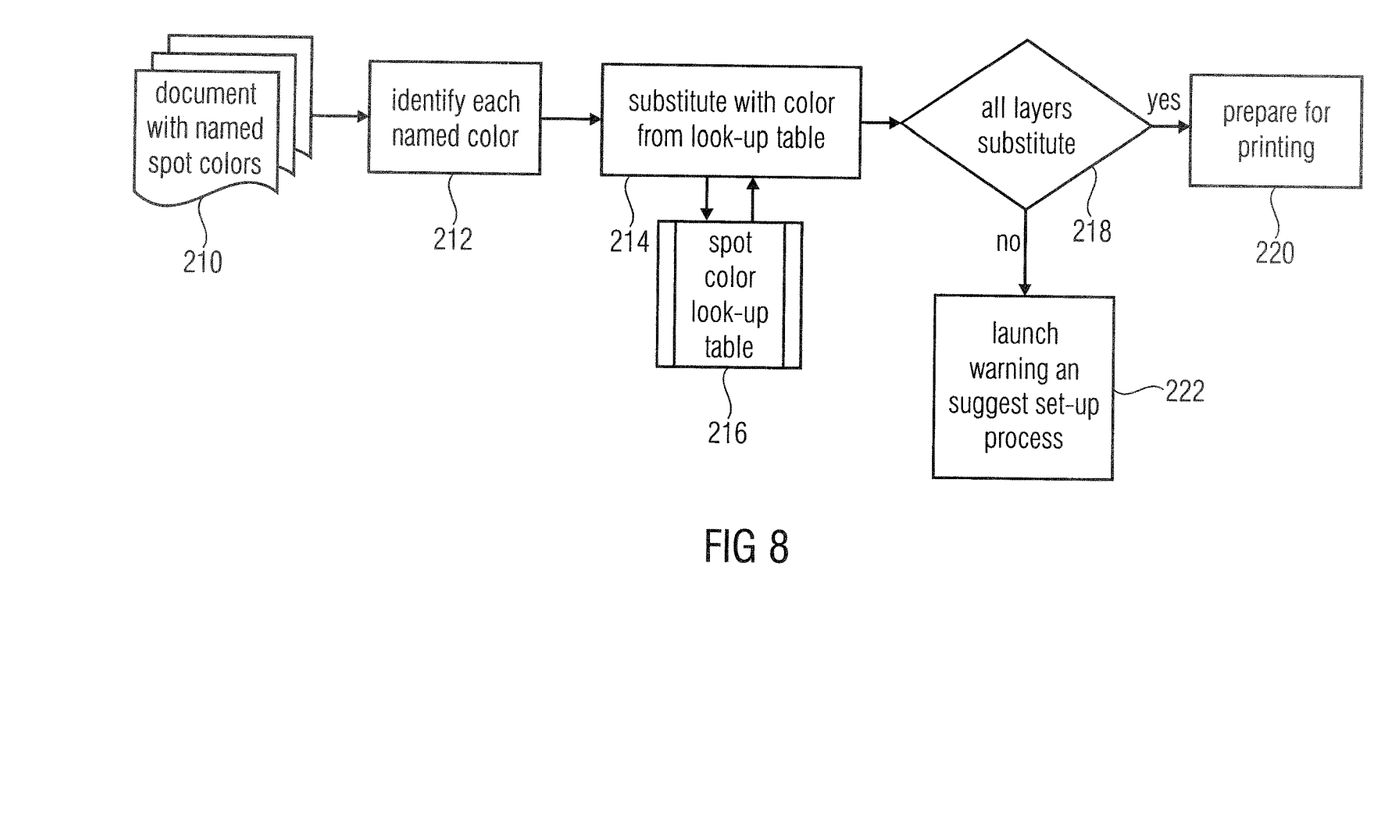
FIG. 8 is a schematic block diagram of an example of a printing process.

FIG. 8 is a schematic block diagram of an example of a printing process. At 210 a single document or a plurality of documents including a named spot color are provided, e.g., in electronic form to the printing system. On the basis of the information derivable from the files to be printed, at block 212, each named spot color is identified and substituted with a color from a look-up table of the printing system as is indicated at block 214. FIG. 8 shows schematically the spot color look-up table 216 coupled to block 214 from which, for the respective spot colors, the associated Lab values or contone values or print colors are derived. Block 214 may include the above described calibration process which may also update the look-up table 216 as is shown schematically by the arrow pointing from block 214 to block 216. At block 218 it is determined whether all spot color layers in the document to be printed have been substituted. If this is true, at block 220, the printing system prepares the electronic file 210 for printing, and the printing is performed on the basis of the colors selected from the look-up table for printing the spot colors in the document. Otherwise, in case block 218 indicates that it is not possible to substitute all spot colors, for example because the electronic documents 210 include new spot colors not yet mapped to respective print colors of the printing system, at block 222 a warming may be launched and a spot color setup process as described above may be launched by the user.

Figure 9:
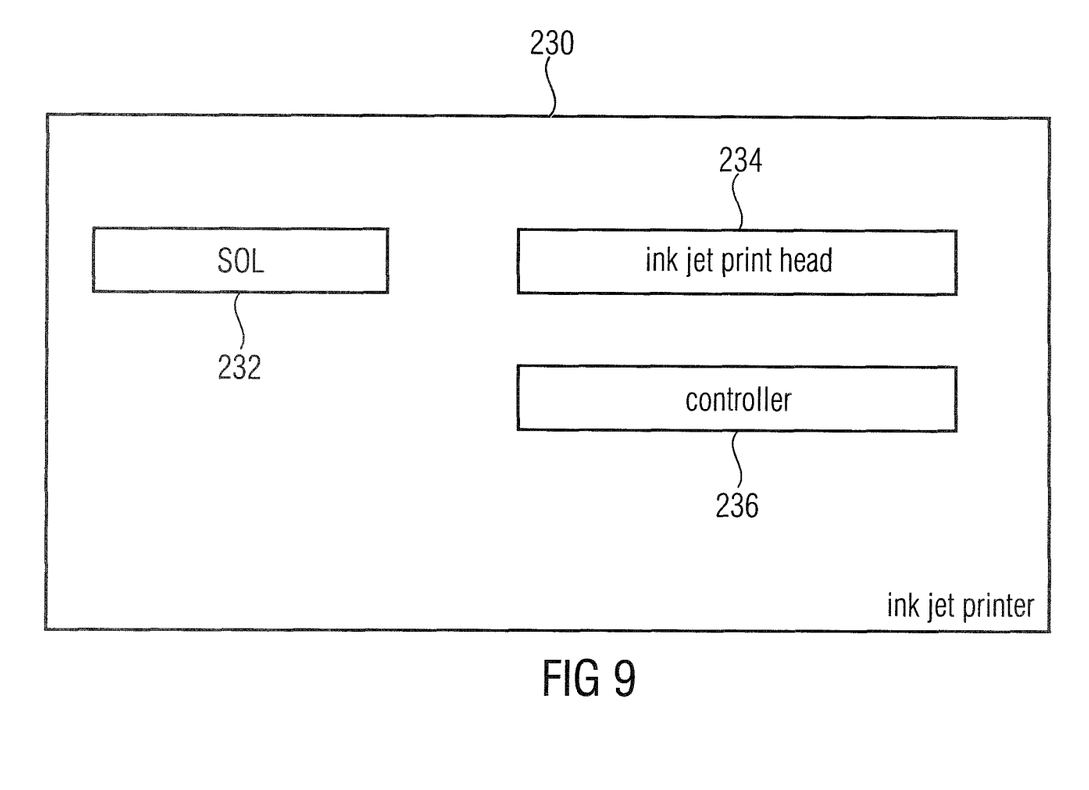
FIG. 9 is a schematic block diagram of an ink jet printer according to an example.

FIG. 9 is a schematic block diagram of an ink jet printer 230 according to an example implementing the techniques described herein. The ink jet printer 230 may include an internal photospectrometer 230 allowing for a measurement of color samples printed on a medium by means of the ink jet printer. The ink jet printer 230 comprises an ink jet printhead 234 which may include a plurality of ink cartridges holding inks of different colors. The printer 230 includes a controller 236 and the operation of the printer may be generally controlled by the controller 236. The controller 236 may comprise a processor, such as a microprocessor, coupled to a memory through an appropriate communication bus. In accordance with the examples, the controller may be programmed for performing the calibration process and/or the spot color setup process described above. The memory may be provided to store the above mentioned look-up table. The printer 230 schematically depicted in FIG. 9 may include a moveable printhead that is scanned across the print medium during printing or it may be a stationary printhead spanning the entire width of the possible print media.

Figure 10:
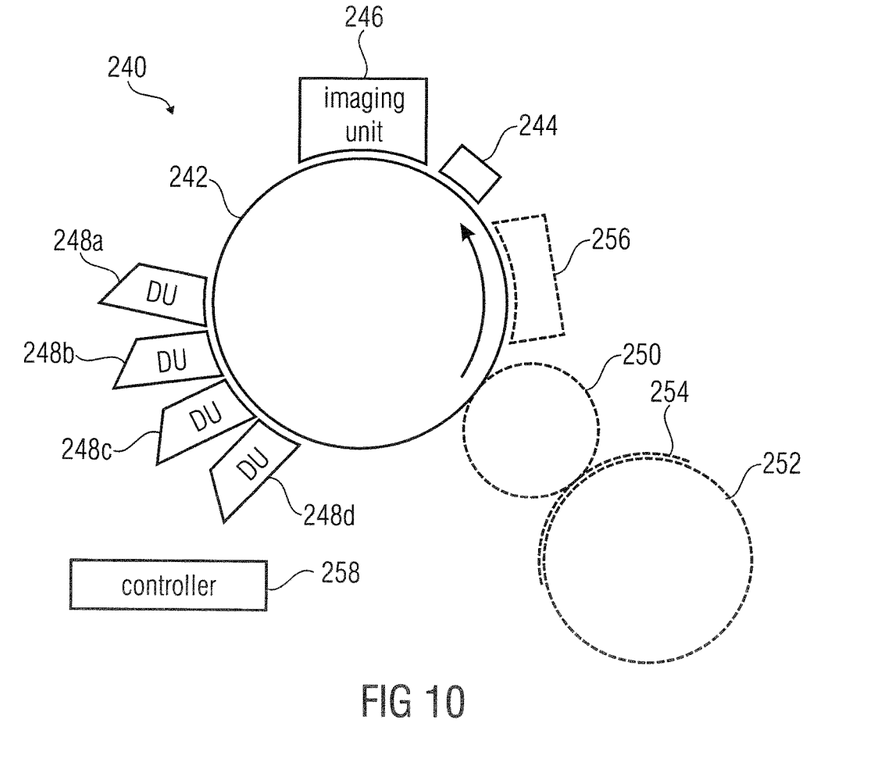
FIG. 10 is a block diagram of a liquid electro-photographic (LEP) printer according to an example.

FIG. 10 is a block diagram of a liquid electro-photographic (LEP) printing system 240 according to an example implementing the techniques described herein. The printing system 240 includes a photoconductor member 242 which may be in the form of a drum, although another example of a photoconductor member 242 may have a different form, such as a continuous belt. In operation, the photoconductor member 242 rotates in the direction shown by the arrow. A charging unit 244 generates a substantially uniform electrical charge on a surface of the photoconductor member 242. The printing system 240 further includes an imaging unit 246 to selectively dissipate an electric charge of the photoconductor member 242 by selectively emitting light onto the surface of the photoconductor member 242. The imaging unit 246 selectively dissipates charge in accordance with an image to be printed. The imaging unit 246 creates a latent electrostatic image on the surface of the photoconductor member 242 that comprises charged areas and non-charged areas that correspond to portions of the image that are to receive toner and portions of the image that are not to receive toner. Developer units 248a to 248d holding liquid toner of different color are provided to electrostatically transfer the liquid toner stored therein to the surface of the photoconductor member 242 according to the latent image thereon. Once the image has been developed it may be electrostatically transferred to an intermediate transfer member 250 for onward transfer, under pressure from an impression roller 252, to a medium 254. In other examples, the image developed on the photoconductor member 242 may be transferred directly to the medium 254 without the use of an intermediate transfer member 250. In some examples, a cleaning unit 256 may be provided to remove any traces of toner remaining on the surface of the photoconductor member 242 after transfer of the image as well as to dissipate any residual electrical charges on the surface of the photoconductor member 242. Depending on the size of the photoconductor member 242 and the size of the image to be printed, a latent image corresponding to just a portion of the image to be printed may be present on the photoconductor member 242 at a time.

The printing system 240 further includes the printer controller 258 and the operation of the printing system 240 is generally controlled by the printer controller 258. The printer controller 258 may comprise a processor, such as a microprocessor, coupled to a memory through an appropriate communication bus. As mentioned above with regard to FIG. 9, also in the example of FIG. 10, the controller may be provided to perform the calibration and/or spot color setup process described above and to also store the above mentioned look-up table.

Although some aspects of the techniques described herein have been described in the context of an apparatus, these aspects may also represent a description of the corresponding method, where a block or device corresponds to a method step or a feature of a method step. Analogously, aspects described in the context of a method step also represent a description of a corresponding block or item or feature of a corresponding apparatus.

Examples relate to a non-transitory machine-readable storage medium encoded with instructions executable by a processing resource of a computing device to perform methods described herein.

It will be appreciated that examples described herein can be realized in the form of hardware, machine readable instructions or a combination of hardware and machine readable instructions. Any such machine readable instructions may be stored in the form of volatile or non-volatile storage such as, for example, a storage device like a ROM, whether erasable or rewriteable or not, or in the form of memory such as, for example, RAM, memory chips, device or integrated circuits or an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein.

All of the features disclosed in this specification, including any accompanying claims, abstract and drawings, and/or all of the steps of any method or process so disclosed may be combined in any combination, except combinations where at least some of the features and/or steps are mutually exclusive. Each feature disclosed in this specification, including any accompanying claims, abstract and drawings, may be replaced by other features serving the same, equivalent or similar purpose, unless expressly stated otherwise. Thus, unless expressly stated otherwise, each feature disclosed is one example of a generic series of equivalent or similar features.

The invention claimed is:

1. A method, comprising:
    determining that a print color established for printing a reference color by a printing system using multiple colors has a measured difference from the reference color by more than a color consistency threshold;
    in response to determining that the print color measurably differs from the reference color by more than the color consistency threshold, creating a color calibration chart including a plurality of colors that are variations of the print color, each color measurably differing from the print color by less than the measured difference;
    measuring the colors in the calibration chart; and
    selecting from the calibration chart the color for printing the reference color which has a measurement value indicative of a color consistency within a predefined distance from a reference value for the print color, calibrating the printing system for printing the reference color using the multiple colors by replacing the print color with the selected color for printing the reference color; and
    printing an image including the reference color by using the color selected from the calibration chart for the reference color.

2. The method of claim 1, wherein the plurality of colors that are variations of the print color in the calibration chart are generated by printing a plurality of color patches having increasing color differences from the print color.

3. The method of claim 1, wherein the colors that are variations of the print color are independent of the ICC profile of the printing system.

4. The method of claim 1, wherein the colors in the color calibration chart depend on a location of the print color on a gamut.

5. The method of claim 1, wherein the colors in the calibration chart are photospectrometrically measured by a photospectrometer of the printing system.

6. The method of claim 1, wherein selecting the color from the calibration set comprises analyzing the vector contribution of the color difference between the measurement value and the reference value.

7. The method of claim 1, comprising, in case there is no measurement value indicative of the color consistency within the predefined distance from the reference value, creating a further calibration chart having a plurality of variations of the print color generated with color differences from the print color which are smaller than the color differences in the preceding calibration chart, and repeating the measuring and the selecting.

8. The method of claim 1, comprising obtaining a reference value for the print color, the reference value representing the reference color.

9. The method of claim 8, wherein obtaining the reference value comprises: printing the reference color; photospectrometrically measuring the printed reference color; and storing the measurement result as the reference value.

10. The method of claim 9, wherein the reference color is printed using colors of the printing system obtained from a lookup table associating the reference color with the colors of the printing system for printing the reference color.

11. The method of claim 8, wherein the creating, the measuring and the selecting is performed in response to a predefined event.

12. The method of claim 11, wherein the predefined event comprises a lapse of a predefined time interval after obtaining the reference value for the print color or after the last printout of the reference color, or a modification of the printing system, or a change of environmental parameters when compared to the environmental parameters at the time of obtaining the reference value.

13. The method of claim 1, comprising: based on a physical representation of the reference color, creating a color chart having a plurality of colors, the plurality of colors including the color for printing the reference color by the printing system and a plurality of variations of the color; visually evaluating the color chart by a user and selecting from the chart one of the colors to be used for printing the reference color; and storing the selected color as the print color for printing the reference color.

14. A non-transitory computer-readable medium having instructions which, when executed by a processor, cause to processor to:
    determine that a print color established for printing a reference color by a printing system using multiple colors has a measured difference from the reference color by more than a color consistency threshold;
    in response to determining that the print color measurably differs from the reference color by more than the color consistency threshold, create a color calibration chart including a plurality of colors that are variations of the print color, each color measurably differing from the print color by less than the measured difference;
    measure the colors in the calibration chart; and
    select from the calibration chart the color for printing the reference color which has a measurement value indicative of a color consistency within a predefined distance from a reference value for the print color, calibrating the printing system for printing the reference color using the multiple colors by replacing the print color with the selected color for printing the reference color,
    wherein an image including the reference color is printed by using the color selected from the calibration chart for the reference color.

15. A multiple color printing system, comprising:
    a print head;
    a measurement device; and
    a controller to cause the print head to:
        determining that a print color established for printing a reference color by a printing system using multiple colors has a measured difference from the reference color by more than a color consistency threshold;
        in response to determining that the print color measurably differs from the reference color by more than the color consistency threshold print a color calibration chart including a plurality of colors that are variations of the print color, each color measurably differing from the print color by less than the measured difference;

cause the measurement device to measure the colors in the calibration chart, and to select from the calibration chart the color for printing the reference color which has a measurement value indicative of a color consistency within a predefined distance from a reference value for the print color, calibrating the printing system for printing the reference color using the multiple colors by replacing the print color with the selected color for printing the reference color, wherein the multiple color printing system prints an image including the reference color is printed by using the color selected from the calibration chart for the reference color.

* * * * *

UNITED STATES PATENT AND TRADEMARK OFFICE
CERTIFICATE OF CORRECTION

PATENT NO. : 10,341,535 B2
APPLICATION NO. : 15/542719
DATED : July 2, 2019
INVENTOR(S) : Andreas Muller Page 1 of 1

It is certified that error appears in the above-identified patent and that said Letters Patent is hereby corrected as shown below:

On the Title Page

Column 2, item (74), Attorney, Agent, or Firm, Line 1, delete "Ptent" and insert -- Patent --, therefor.

Signed and Sealed this
Fifth Day of November, 2019

Andrei Iancu
*Director of the United States Patent and Trademark Office*